(No Model.)

J. W. BABBIT.
SKIMMER FOR EVAPORATING PANS.

No. 278,074. Patented May 22, 1883.

Witnesses.
Saml. R. Turner
N. J. Osgood

Inventor
Joseph W. Babbit
by Howard A. Snow
Atty

UNITED STATES PATENT OFFICE.

JOSEPH W. BABBIT, OF HIAWATHA, KANSAS.

SKIMMER FOR EVAPORATING-PANS.

SPECIFICATION forming part of Letters Patent No. 278,074, dated May 22, 1883.

Application filed February 9, 1883. (No model.)

*To all whom it may concern:*

Be it known that I, JOSEPH W. BABBIT, a citizen of the United States of America, residing at Hiawatha, in the county of Brown and State of Kansas, have invented certain new and useful Improvements in Skimmers for Evaporating-Pans, of which the following is a specification, reference being had therein to the accompanying drawings.

My invention relates to revolving skimmers for evaporating-pans, and for other purposes to which it may be found applicable; and it consists in the construction and arrangement of its several parts, as will be hereinafter fully set forth, and pointed out in the claims.

Figure 1:
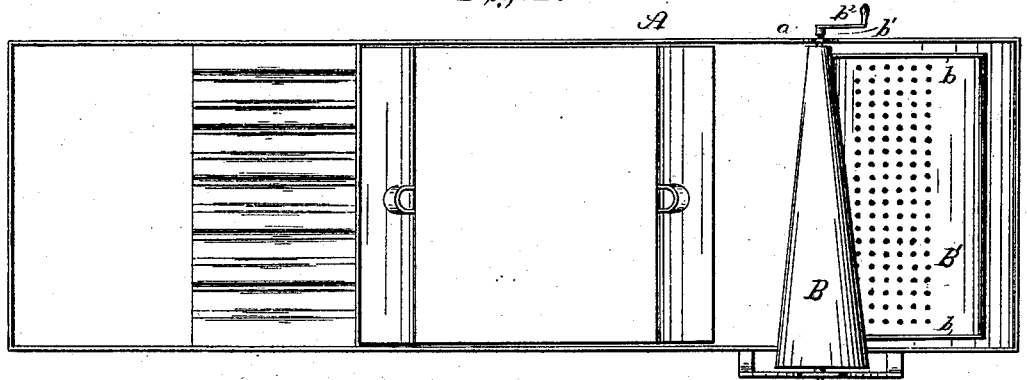
Figure 2:
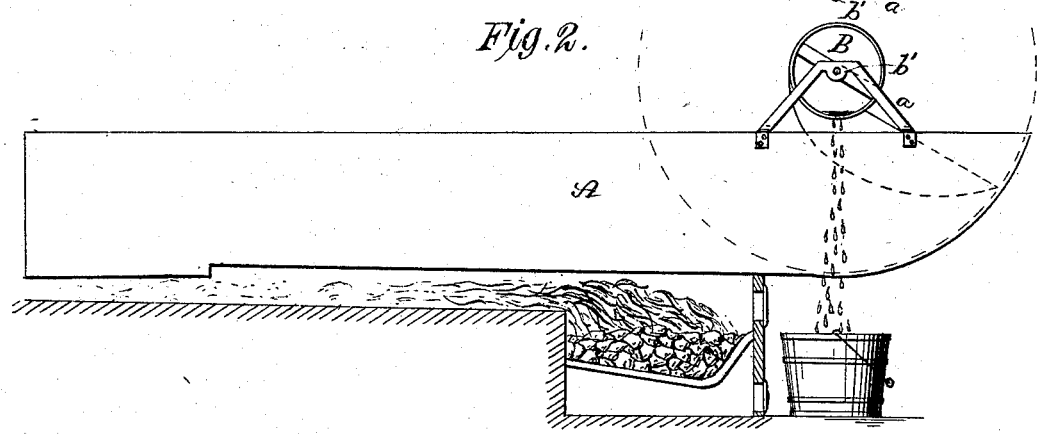
Figure 3:
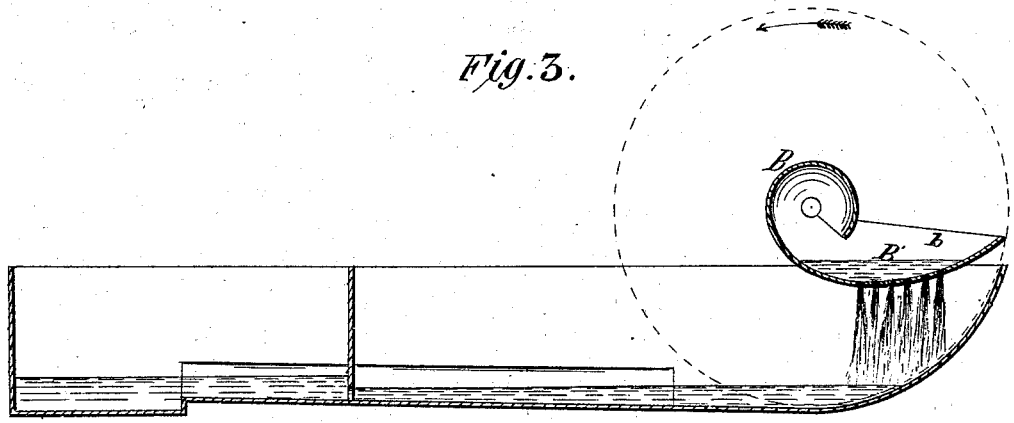

In the drawings, Figure 1 is a top plan view. Fig. 2 is a side elevation, and Fig. 3 is a vertical cross-section of the skimmer and vertical longitudinal section of a pan. All the figures show my skimmer attached to a pan.

A represents an evaporating-pan, not necessarily of special construction in order to enable it to accommodate my skimmer. In the pan shown, however, the end to which the skimmer is attached is curved, and I prefer this form of pan as one adapted to enable my skimmer to best perform its labor. Secured vertically to opposite sides of the pan are the supports $a$, between which the skimmer is journaled. It will be seen by inspection of Fig. 1 that the support upon lower side of the figure projects somewhat from the side of the pan to accommodate the large end of the skimmer, which is journaled therein, as shown.

The skimmer is formed of an elongated cone, B, from the side of which projects a laterally-curved scoop, B', as shown. This scoop is formed with perforations, through which pass the liquids that are drawn into the scoop with the refuse matter. A slot is cut in the cone along the line where the scoop is joined thereto, which slot is plainly shown in Fig. 3. The scoop is further provided with sides, $b$, which retain the liquid and refuse therein. The skimmer is journaled between the supports $a$ by means of the journal-pins $b'$, which project from the center of each end of the cone. A brace, however, is secured across the open large end, to which the journal-pin on that side is secured. A crank, $b^2$, is attached to the journal-pin on the small end of the cone, by means of which the skimmer is revolved.

In the operation of the skimmer it will be seen that the cone is journaled horizontally between the supports, the refuse matter which enters the cone will be gravitated toward the large open end, and will fall therefrom to the ground. The skimmer is revolved by means of the crank $b^2$ in the direction indicated by the arrow, Fig. 3. The scoop enters the liquid in the pan, gathers the refuse collected on its top, allows the liquor drawn in to flow back into the pan, and by its continued revolution causes the refuse to pass through the slot into the cone, where it will gravitate toward the large end and from thence pass out.

What I claim is—

1. In combination with an evaporating-pan, the skimmer formed of a cone, B, having attached thereto a scoop, B', said cone having a slot cut in it where it joins with the scoop, and means for operating the skimmer, substantially as shown and described.

2. The combination, with an evaporating-pan provided with the supports between which is journaled the skimmer, of the skimmer formed of a cone, B, having its large end open for the passage therefrom of the refuse material, and further provided with a scoop, B', all arranged to operate substantially as shown and described.

In testimony whereof I affix my signature, in presence of two witnesses, this 8th day of December, 1882.

JOSEPH W. BABBIT.

Witnesses:
 J. D. BLAIR,
 A. G. SPEER.